United States Patent [19]

Tsurumi et al.

[11] 4,177,181
[45] Dec. 4, 1979

[54] FLAME-RETARDANT ADHESIVE COMPOSITIONS

[75] Inventors: Michio Tsurumi; Takashi Sakakiyama; Kichiya Tazaki; Masaoki Koyama, all of Yokohama, Japan

[73] Assignee: Asahi-Dow Limited, Tokyo, Japan

[21] Appl. No.: 886,852

[22] Filed: Mar. 15, 1978

[30] Foreign Application Priority Data

Mar. 18, 1977 [JP] Japan ................................. 52-29306

[51] Int. Cl.$^2$ ........................................... C08F 236/18
[52] U.S. Cl. ............................ 260/29.7 H; 156/333; 526/317; 525/243
[58] Field of Search ................. 526/317; 260/29.7 H, 260/29.7 W, 29.7 UP, 28.5 D, 879

[56] References Cited

U.S. PATENT DOCUMENTS

| | | | |
|---|---|---|---|
| 2,476,967 | 7/1949 | Fiedler | 526/338 |
| 2,711,400 | 6/1955 | Harrison | 260/879 |
| 3,309,330 | 3/1967 | Settlage | 260/29.6 TA |
| 3,962,170 | 6/1976 | Mally | 526/317 |

*Primary Examiner*—Paul R. Michl
*Attorney, Agent, or Firm*—James B. Guffey

[57] ABSTRACT

Improved copolymer latexes and flame-retardant or self-extinguishing adhesive compositions comprising such latexes are provided wherein the copolymer particles of the latexes are beneficially composed of from about 5 to about 60 weight percent of an aliphatic conjugated diolefin; from about 5 to about 55 weight percent of an aromatic vinyl monomer, an acrylate ester or a methacrylate ester; from about 0.5 to about 10 weight percent of an ethylenically unsaturated carboxylic acid; and from about 25 to about 70 weight percent of vinylidene chloride and wherein the copolymer latexes are obtained by first emulsion copolymerizing a first monomer mixture which includes substantially all of the vinylidene chloride, and then emulsion copolymerizing, in the presence of the first copolymerization product, a second monomer mixture which includes substantially all of the aliphatic conjugated diolefin and substantially all of any aromatic vinyl monomer to be employed.

10 Claims, No Drawings

FLAME-RETARDANT ADHESIVE COMPOSITIONS

BACKGROUND OF THE INVENTION

The present invention relates to vinylidene chloride copolymer latexes and improved self-extinguishing or flame-retardant adhesive compositions thereof and, more specifically, to such compositions containing a copolymer latex which is produced from an aliphatic conjugated diolefin, a monoolefinic monomer selected from the group consisting of aromatic vinyl monomers, acrylate esters and methacrylate esters, an ethylenically unsaturated carboxylic acid, and vinylidene chloride.

In recent years, with increasingly higher demand for incombustible interiors in public facilities, extensive attempts or studies (mainly in terms of components to be blended) have been made directed to providing adhesives with a flame-retardant or incombustible property, not only in those adhesives applied to a wide variety of textile products including cushioning materials for railroad cars and automobiles as well as floor and wall materials such as carpets, moquettes, curtains, cushioned floors, etc., but also in those used for various kinds of materials such as in the manufacture of plywood and in the formulation of paints.

Conventionally, flame-retardant blended adhesive compositions for the aforementioned types of materials generally comprise a natural rubber latex, synthetic rubber latex such as styrene-butadiene copolymer, or vinyl acetate or acrylic synthetic resin emulsions, blended with organic or inorganic flame retardants such as halogenated paraffins, halogenated aromatic compounds, phosphorus compounds, alumunium hydroxide, antimony trioxide and so forth. However, in order to obtain satisfactory durable flame retardance in such conventional adhesive compositions, relatively large quantities of relatively expensive flame retardants must be blended in combination. Accordingly, the powder dispersion and blending process (as well as the resulting adhesives) are rendered very expensive and very complicated. Moreover, the prior art flame-retardant adhesive compositions have additional disadvantages in that the blending of such flame-retardants results in decreased latex stability, impedes reactions such as vulcanization and, especially, results in a remarkable reduction in adhesiveness and water resistance which are properties of great importance from a practical point of view.

The use of self-extinguishing halogen-containing latexes such as vinylidene chloride latexes, chloroprene latexes, vinyl chloride latexes, etc., as adhesive components of flame-retardant blended compositions is also well known in the art. In fact, vinylidene chloride latexes having a high chlorine content are known to be extremely useful as adhesive components of flame-retardant compositions because of their remarkably high flame retardance. However, such high chlorine content latexes have the following disadvantages: (1) low colloidal stability or storage stability as well as low stability against metal ions and alkalis; (2) gradual dehydrochlorination occurring when exposed to heat or light, resulting in coloration and deterioration in strength; and (3) limited applicability to many materials by virtue of inadequate adhesiveness thereto. Thus, in spite of the feature of excellent flame-retardance, such high chlorine content vinylidene chloride latexes, as used as adhesive components of flame-retardant blended compositions for various substrates, are extremely limited in their applicable scope. Further, the use of adhesive compositions containing a copolymer latex of vinylidene chloride and butadiene and styrene (U.S. Pat. No. 2,476,967), a copolymer latex of vinylidene chloride-styrene-butadiene-ethylenically unsaturated carboxylic acid (West German Provisional Pat. Publication No. 2,451,627), or a blended latex of vinylidene chloride latex and styrene/butadiene latex is also accompanied by several disadvantages similar to those described above, particularly, inferiority in colloidal stability and instability against heat and light.

In view of the foregoing deficiencies of the prior art flame-retardant adhesive compositions, it is highly desirable to provide self-extinguishing or flame-retardant adhesive compositions which have an improved combination of properties and, especially, which reduce the aforementioned shortcomings of such prior art adhesives.

SUMMARY OF THE INVENTION

Accordingly, this invention is a novel copolymer latex which is obtained by emulsion copolymerization of monomers consisting essentially of an aliphatic conjugated diolefin, a monoolefinic monomer selected from the group consisting of aromatic vinyl monomers, acrylate esters and methacrylate esters, an ethylenically unsaturated carboxylic acid and vinylidene chloride in a manner such that a first monomer mixture containing substantially all of the vinylidene chloride is first subjected to emulsion copolymerization and that copolymerization is then followed by emulsion copolymerization, in the presence of the first copolymerization product, of a second monomer mixture containing substantially all of the aliphatic conjugated diolefin and substantially all of any aromatic vinyl monomer employed. The latex thus obtained is far superior to blended latexes of a vinylidene chloride latex and styrene/butadiene latex and to tetrapolymer latexes of vinylidene chloride-styrene-butadiene-ethylenically unsaturated carboxylic acid in regard to colloidal stability and in resistance to discoloration by heat and light as well as in adhesiveness to various types of substrates.

Further, flame-retardant or self-extinguishing adhesive compositions comprising the copolymer latexes of the present invention are also provided which are advantageous (and are thus of high industrial value) in terms of processes for the preparation and use thereof in that complicated dispersion processes can be avoided in the preparation of such adhesive compositions and in that deleterious effects on reactions such as vulcanization can be substantially eliminated in the use of such adhesive compositions. Further, the present invention provides improved fibrous materials, laminated composite materials and paints which employ flame-retardant or self-extinguishing compositions of the invention as adhesives therein or thereon.

As used herein, the term "flame-retardant" means that the material to which such term refers has a limited propensity to ignite upon exposure to a small scale ignition source such as a Bunsen burner and that, if ignited upon such exposure, such material exhibits a limited propensity to propagate combustion after removal of such small scale ignition source. As used herein, the term "self-extinguishing" refers to materials which ignite fairly readily upon exposure to a small scale ignition source (e.g., a Bunsen burner) but which exhibit a limited propensity to propagate combustion after removal of such ignition source. Naturally, those materials which exhibit both limited propensity to ignite and limited propensity to propagate (i.e., those materials which are "fire-retardant") are particularly preferred.

A test procedure for determining both of the foregoing characteristics (i.e., propensity to ignite and propensity to propagate combustion) is set forth in detail hereinafter. (See the Incombustibility Testing Procedure in Example 1 below.) It should be recognized, however, that all known synthetic polymers will burn when continuously subjected to a sufficiently intense heat source. Accordingly, the indicated test method should not be taken as reflecting behavior under actual fire conditions.

At the present stage, the mechanism by which the copolymer latexes of the invention achieve the indicated advantageous effects is not clear and, accordingly, it is not intended to limit the present invention to any particular theory as to such mechanism. However, it is presently assumed that some special, unique structure may be imparted to the dispersed polymer particles (e.g., formation of special stabilized layers thereon) during the course of the indicated emulsion copolymerization process.

DETAILED DESCRIPTION OF THE INVENTION

The present invention provides latexes of vinylidene chloride copolymers and flame-retardant or self-extinguishing adhesive compositions comprising such latexes as a principal component thereof. Such copolymer latexes are beneficially obtained by emulsion copolymerizing, in aqueous medium, from about 5 to about 60 weight percent of an aliphatic conjugated diolefin, from about 5 to about 55 weight percent of a monoolefinic monomer selected from the group consisting of aromatic vinyl monomers, acrylate esters and methacrylate esters, from about 0.5 to about 10 weight percent of ethylenically unsaturated carboxylic acid and from about 25 to about 70 weight percent of vinylidene chloride in an emulsion copolymerization process in which a first monomer mixture containing substantially all of the vinylidene chloride is first subjected to emulsion copolymerization and then a second monomer mixture containing substantially all of the aliphatic conjugated diolefin and substantially all of any aromatic vinyl monomer employed is subjected to emulsion copolymerization in an aqueous medium comprising the product of the first emulsion copolymerization.

As is noted above, the present invention requires that substantially all of the vinylidene chloride of the latex of the invention must be employed in the first monomer mixture and that substantially all of the indicated aliphatic conjugated diolefin of such latex and substantially all of any aromatic vinyl monomer of such latex must be employed in the second monomer mixture. The remainder of the hereinbefore indicated monomers can be distributed between the first and second monomer mixtures as desired. Thus, for example, the amount which is employed of the ethylenically unsaturated carboxylic acid can be entirely contained either by the first monomer mixture or by the second monomer mixture, as desired, or alternatively, a portion of such ethylenically unsaturated carboxylic acid can be contained in each of the two monomer mixtures.

Similarly, the amount of any acrylate ester and/or methacrylate ester desired to be employed can be contained either by the first monomer mixture or by the second monomer mixture or, that type of monomer component can be apportioned between the two monomer mixtures as desired. Thus, for example, all of any acrylate ester employed can be contained by either the first or the second monomer mixture or, if desired, a portion of it can be employed in each of the two monomer mixtures. Similarly, all of any methacrylate ester employed can be contained by either the first or the second monomer mixture or, if desired, a portion of it can be employed in each of the two monomer mixtures.

As an aliphatic conjugated diolefin for the compositions according to the present invention, butadiene or isoprene can be used. If desired, for example, in order to obtain increased fire-retardant or self-extinguishing effectiveness, chloroprene may also be used. These monomers are of significance in that they provide the resultant copolymer with a reasonable elasticity and have a great effect on the touch and appearance of, for example, final textile products. Beneficially, these monomers are employed in the range of from about 5 to about 60 weight percent based upon the total monomer weight. Their content below about 5 weight percent will generally neither give an adequate elasticity nor produce a proper touch and appearance, while a content above about 60 weight percent is not preferable because the adhesiveness and wet strength will generally be decreased.

The monoolefinic monomer which is used in the present invention may be selected from the group consisting of: aromatic vinyl monomers such as styrene, α-methylstyrene, vinyltoluene, etc.; acrylate esters such as methyl acrylate, ethyl acrylate, butyl acrylate, 2-hydroxyethyl acrylate, etc.; and methacrylate esters such as methyl methacrylate, ethyl methacrylate, 2-hydroxyethyl methacrylate, glycydyl methacrylate, etc. These monoolefinic monomers provide reasonable hardness to the resultant copolymer and improved wet strength to textile products. Beneficially, these monomers are employed singly or in combination in the range of from about 5 to about 55 weight percent based on the total monomer weight.

As an ethylenically unsaturated carboxylic acid which can be used for the compositions according to the present invention, acrylic acid, methacrylic acid, maleic acid, fumaric acid, itaconic acid or dicarboxylic anhydrides may be adopted. Use of these ethylenically unsaturated carboxylic acids in the range of from about 0.5 to about 10 weight percent based on the total monomer weight is beneficial to improve not only the adhesiveness of the resultant compositions to substrates but also the mechanical stability of copolymer latexes. A content below about 0.5 weight percent will generally not produce such effects, while a content above about 10 weight percent is not preferable because such an excessive content will generally reduce the wet strength.

Vinylidene chloride constituting one component of the copolymer latexes according to the present invention is indispensible for imparting flame-retardant or self-extinguishing properties thereto and is beneficially employed for that purpose in the range of from about 25 to about 70 weight percent of total monomers. Its content below about 25 weight percent will generally not give adequate self-extinguishing or flame-retardant properties; while a content thereof above about 70 weight percent is not preferable, in that such an excessive content will generally lessen the colloidal stability of the resultant copolymer latexes as well as the discoloration resistance to heat and light.

The emulsion copolymerization process for producing the copolymer latexes according to the present invention is arranged such that a first monomer mixture containing substantially all of the vinylidene chloride is first emulsion copolymerized to form an intermediate vinylidene chloride copolymer latex and, thereafter, a second monomer mixture, containing substantially all of the aliphatic conjugated diolefin and substantially all of any aromatic vinyl monomer employed, is added to the resulting intermediate vinylidene chloride copolymer latex and is emulsion copolymerized therein. In this process, it is preferable that the emulsion copolymerization of the first monomer mixture should be effected at a relatively lower temperature below, for example, 70° C. from a viewpoint of polymerization stability, while the emulsion copolymerization of the second monomer mixture may be effected in a high-temperature polymerization or in a low-temperature polymerization process using a redox polymerization initiator. However, it should be noted that such a mode of reaction does not impose any limitations on the present invention.

An anionic emulsifier is preferably used for obtaining the copolymer latexes according to the present invention. Such anionic emulsifiers include sulfates of higher alcohol, alkylaryl sulfonates, alkyl sulfonates, etc. Also, nonionic emulsifiers such as polyoxyethylene alkyl ether, polyoxyethylene alkylphenol ether or fatty acid ether of polyethylene glycol may be used in combination with said anionic emulsifiers. As a polymerization initiator for use in the present invention, inorganic peroxides such as persulfates and hydrogen peroxide or organic peroxides such as cumene hydroperoxide and lauroyl peroxide or so-called redox catalysts utilizing reducing agents such as sodium hyposulfite and formaldehyde sulfonates in combination with the aforementioned oxidizing agents may be adopted.

Optionally, conventional molecular weight modifiers can be employed in the polymerization of the copolymer latexes according to the present invention. Examples of such conventional modifiers include mercaptans such as t-dodecyl mercaptan, halogenated hydrocarbons such as methylene chloride, etc.

The flame-retardant or self-extinguishing adhesive compositions of the invention comprise as a principal component thereof the hereinbefore described copolymer latex and can also contain mineral pigments such as clay and calcium carbonate, auxiliary binders such as casein, phenol resin and urea resin, or other various kinds of additives including vulcanizing agents, vulcanization accelerators, antioxidants, thickeners, etc., as desired. Also, it should be noted that the adhesive compositions based on the copolymer latexes according to the present invention can also contain conventional organic or inorganic flame-retardant additives including halogenated hydrocarbons such as chlorinated paraffin, halogenated aromatic compounds such as pentabromotoluene, and various phosphorus compounds, ammonium bromide, aluminium hydroxide, antimony trioxide, etc., if desired. However, such flame-retardant additives are not necessary for most purposes in the adhesive formulations of the invention.

The flame-retardant or self-extinguishing adhesive compositions of the invention are useful in conjunction with various fibrous material (e.g., substrates) to provide flame-retardant or self-extinguishing fibrous articles comprising such adhesive compositions (e.g., as an external adhesive layer or coating, as an internal adhesive binder, etc.). Examples of such fibrous materials include organic and inorganic natural fibrous materials such as pulp, coconut fiber, cotton, wool, asbestos, rock wool, regenerated fibrous materials such as rayon, synthetic chemical fibrous materials such as nylon, polyester, polyacrylonitrile, polypropylene, polyvinylidene chloride, and inorganic chemical fibrous materials such as glass fibers, carbon fibers, etc.

In terms of the mode of application to various industrial processes, the flame-retardant or self-extinguishing adhesive compositions according to the present invention may be used for backsizing of substrates such as carpets, moquettes, cushioned floors, etc., impregnation into, or coating onto, substrates such as unwoven fabrics, paper sheets, etc., and lamination of various substrates.

Besides the aforementioned fibrous materials and/or substrates, the flame-retardant or self-extinguishing adhesive compositions according to the present invention are also useful for adhesion or glueing of various types of materials, including paper-to-paper, paper-to-metal foil; between synthetic resin films such as nylon, polyester, polypropylene, polyethylene, polyvinyl chloride, polystyrene films, etc., or between foamed films; combinations of synthetic resin films or foamed films with paper or metal foil to form so-called laminated films; or laminated composite materials such as clad plates of wood-to-wood, wood-to-polyvinyl chloride film, wood-to-metal foil, etc. In addition, the flame-retardant or self-extinguishing adhesive compositions according to the present invention are particularly advantageous when used in paint compositions to provide flame-retardant or self-extinguishing paints which may be coated on incombustible materials such as metal or slates to ensure that the spread of a fire due to combustion of the paint film itself can be prevented.

Hereinafter, the present invention will be described further in detail by way of examples of preferred embodiments thereof as compared with several examples having conventional formulations. However, it should be understood that the scope of the present invention is not limited by these preferred embodiments in any sense. In the description of the preferred embodiments and comparative examples that follow, all parts are given in parts by weight.

EXAMPLE NO. 1

Preferred Embodiments of the Latexes of the Invention

| Polymerization Formulation (I) | Part by weight |
|---|---|
| Deionized water | 40.8 |
| Vinylidene chloride | 35.0 |
| Methyl acrylate | 3.89 |
| Acrylic acid | 0.78 |
| Sodium dodecylbenzene sulfonate | 0.79 |
| Potassium persulfate | 0.24 |
| Sodium hydroxide | 0.08 |

A monomer mixture containing vinylidene chloride was mixed with emulsifier and polymerization initiator in accordance with the Polymerization Formulation (I) set forth above in an autoclave with internal capacity of approximately 8 liters having the inside atmosphere thereof substituted by nitrogen. Such formulation was then subjected to a polymerization for 10 hours at 50° C. under agitation. Then a second polymerization formulation, corresponding to Polymerization Formulation (II) below, was added to the polymerization product of Polymerization Formulation (I) and the resultant formulation was then subjected to a polymerization for 5 hours at 70° C. under agitation.

| Polymerization Formulation (II) | Part by weight |
| --- | --- |
| Deionized water | 61.7 |
| Styrene | 35.0 |
| Butadiene | 24.1 |
| Acrylic acid | 0.90 |
| Sodium dodecylbenzene sulfonate | 0.90 |
| Sodium persulfate | 0.12 |
| t-dodecyl mercaptan | 0.36 |

The above process resulted in an extremely high conversion (close to 100 percent) of monomer to polymer and a good quality copolymer latex was produced without coagulation.

After removing non-reacted monomers from the resultant copolymer latex, caustic soda was added to adjust the pH of the latex to 8.0 and the solid content thereof was adjusted to 48 weight percent. The composition of the copolymer latex is given in Table I (copolymer latex (A)).

Thereafter, polymerization formulations were prepared having the monomer mixtures shown for Latexes (B)–(H) in Table I in a reaction vessel having the inside atmosphere substituted by nitrogen, respectively, and subjected to a polymerization under the same conditions as in the case of Latex (A) except for the indicated differences in monomer composition. These reactions all resulted in greater than 99 percent conversion of monomer to polymer. After removing residual non-reacted monomers from the resultant copolymer latex in each case, the pH of each latex was adjusted to 8.0 by caustic soda and the solid content thereof was adjusted to 48 percent by weight as was done in the case of Latex (A) above.

Nine copolymer latexes, namely, copolymer latexes (A)–(F) (preferred embodiments of the invention), comparative Examples (G) and (H) and comparative Example (I) which is a blended latex (containing 50 weight percent of vinylidene chloride) of 58.1 parts of a vinylidene chloride latex such as results from polymerization of Polymerization Formulation (I) of Latex (B) and 41.9 parts of styrene-butadiene copolymer latex (comprising 58 parts of styrene, 40 parts of butadiene and 2 parts of acrylic acid), were then subjected to a colloidal stability test against neutralizing agents. In this test, the colloidal stability was judged by the presence, and degree of, coagulation resulting when the pH of the latex was adjusted to 10 by adding thereto 20 weight percent of caustic soda. The test results are presented in Table II.

In addition, the aforementioned nine copolymer latexes were caused to flow on a glass plate and left thereon at constant temperature of 23° C. and constant humidity of 65 percent for 24 hours, until dry films were formed. From these films, specimens of 100 mm long, 15 mm wide and 0.5 mm thick were prepared for a tensile test. In the tensile test, the chuck spacing was set at 50 mm and the tension speed was 200 mm/min. The results of those tensile tests are presented in Table II.

Further, the aforementioned nine copolymer latexes were also subjected to an incombustibility test in the following manner:

Incombustibility Testing Procedure

A film specimen of 50 mm long, 25 mm wide and 0.5 mm thick was horizontally supported over its entire length on a wire netting. Then, the height of the wire netting was adjusted so that the specimen was 13 mm above the top of a Bunsen burner, and a blue burner flame having a visible portion of 38 mm long was brought laterally closer to one end of the film specimen in an attempt to ignite such specimen. In this test, if the specimen was not ignited at all, it was judged as being "incombustible." If the specimen exhibited delayed ignition (i.e., a measurable lapse of time between exposure to the burner flame and ignition of the specimen) and burning ceased (after removal of the burner flame) before the entire specimen was consumed, then the specimen was judged as being "flame-retardant." In such cases, the time required for ignition as well as the time elapsing from the removal of the burner flame immediately after the ignition to its extinguishment were measured. On the basis of this measurement, specimens requiring a longer time for ignition and a shorter time for extinguishment were judged as having a correspondingly better degree of flame-retardance. Those specimens which ignited rather readily (e.g., no substantial lapse of time before ignition upon exposure to the burner flame) and which continued to burn in the longitudinal direction thereof after the removal of burner flame were judged as being "self-extinguishing" if the fire was extinguished before the combusted distance reached 50 mm. In such cases, specimens exhibiting shorter combustion distances were judged as having a correspondingly better degree of self-extinguishing property. Those specimens which continued to burn until the entire specimen was consumed were judged as being "combustible." These test results are also given in Table II.

The aforementioned nine copolymer latexes were also tested for their resistance to heat and light in the following manner:

Heat and Light Resistance Testing

Specimens were prepared by coating fine quality paper (raw paper without clay coating) with a copolymer latex by means of a coating bar (No. 12) at the rate of 10 g/m² in terms of latex solids. Then, the coated paper was dried for 5 hours at 23° C. and constant humidity of 65 percent. The resultant specimens were subjected to heat treatment in a hot air oven at 150° C. for 15 minutes and to ultraviolet exposure in a fade-o-meter for 10 hours. The degree of whiteness of discolored specimens was measured by using a Hunter's chromophotometer, and the heat and light resistances of the specimens were judged on the basis of calculated percent reduction in whiteness with reference to initial whiteness before those treatments. These test results are presented in Table II.

TABLE I

Composition of Copolymer Latexes (A)–(I) in Parts by Weight

| Monomers | Preferred Embodiments of the Latexes of the Invention | | | | | | Comparative Examples* | | |
|---|---|---|---|---|---|---|---|---|---|
| | (A) | (B) | (C) | (D) | (E) | (F) | (G) | (H) | (I)** |
| COMPOSITION I | | | | | | | | | |
| Vinylidene chloride | 35 | 50 | 50 | 50 | 50 | 65 | 20 | 75 | |
| Methyl acrylate | 3.89 | 5.56 | — | — | — | — | 2.22 | 8.33 | |
| Ethyl acrylate | — | — | 5.56 | 5.56 | 5.56 | 7.22 | — | — | |
| Acrylic acid | 0.78 | 1.11 | 1.11 | 1.11 | 1.11 | 1.44 | 0.44 | 1.67 | |
| COMPOSITION II | | | | | | | | | |
| Styrene | 35.0 | 25.1 | 23.4 | 14.7 | 14.7 | 8.96 | 44.9 | 8.70 | |
| | (58) | (58) | (54) | (34) | (34) | (34) | (58) | (58) | |
| Butadiene | 24.1 | 17.3 | 17.3 | 26.0 | 26.0 | 15.8 | 30.9 | 6.00 | |
| | (40) | (40) | (40) | (60) | (60) | (60) | (40) | (40) | |
| Methyl methacrylate | — | — | 1.73 | 1.73 | — | — | — | — | |
| | | | (4) | (4) | | | | | |
| 2-Ethylhexyl acrylate | — | — | — | — | 1.73 | 1.05 | — | — | |
| | | | | | (4) | (4) | | | |
| Acrylic acid | 0.90 | 0.65 | 0.65 | 0.65 | — | 0.40 | 1.16 | 0.23 | |
| | (1.5) | (1.5) | (1.5) | (1.5) | | (1.5) | (1.5) | (1.5) | |
| Fumaric acid | — | — | — | — | 0.65 | — | — | — | |
| | | | | | (1.5) | | | | |

Note:
Numerical values are all given in parts by weight of total monomers taken as 100 parts. Parenthesized values show ratios in parts by weight) versus total monomers of the monomer composition (II) taken as 100.
*Not examples of the invention.
**Blended latex of styrene-butadiene copolymer latex (41.9 parts by weight) and vinylidene chloride copolymer latex (58.1 parts by weight).

TABLE II

| Preferred Embodiments of the Latexes of the Invention | Colloidal[1] Stability | Tensile Strength of Film (kg/cm$^2$) | Elongation of Film (%) | Combustibility | Heat[2] Resistance (%) | Light[3] Resistance (%) |
|---|---|---|---|---|---|---|
| (A) | No coagulation | 18 | 810 | Self-extinguishing | 5.7 | 7.8 |
| (B) | " | 26 | 690 | Highly self-extinguishing | 8.4 | 10 |
| (C) | " | 27 | 710 | Highly self-extinguishing | 8.1 | 9.8 |
| (D) | " | 28 | 750 | Highly self-extinguishing | 9.3 | 12 |
| (E) | " | 25 | 780 | Highly self-extinguishing | 9.6 | 11 |
| (F) | " | 45 | 600 | Flame-retardant | 15 | 21 |

| Comparative Examples* | Colloidal[1] Stability | Tensile Strength of Film (kg/cm$^2$) | Elongation of Film (%) | Combustability | Heat[2] Resistance (%) | Light[3] Resistance (%) |
|---|---|---|---|---|---|---|
| (G) | No coagulation | 15 | 860 | Combustible | 4.5 | 6.6 |
| (H) | Slight coagulation | 65 | 470 | Highly flame-retardant | 40 | 55 |
| (I) | Remarkable coagulation | 21 | 630 | Highly self-extinguishing | 48 | 51 |

Notes:
*Not examples of the invention
[1] pH of latex was adjusted to 10 by addition of 20 weight percent of caustic soda
[2] Heat-treated in hot air drying machine at 150° C. for 15 minutes.

Whiteness reduction rate (%) = $\frac{\text{Whiteness (before treatment)} - \text{Whiteness (after treatment)}}{\text{Whiteness (before treatment)}} \times 100\%$

[3] Exposed to ultraviolet rays in a fade-o-meter for 10 hours. Whiteness reduction rate (%) was calculated in the same manner as in [2] above

EXAMPLE 2

Adhesion of Films and Fabric Using Copolymer Latexes of the Invention

Copolymer latexes (B), (D) and (F) obtained in Example No. 1 were each coated on a nylon film, a polyester film and a cotton-blended fabric by means of coating rod (No. 5) at the rate of 5 g/m$^2$ of latex solids content and each of these substrates was bonded to itself. After drying in a hot air drying machine at 120° C. for 5 minutes, these bonded materials were prepared into specimens of 10 mm long and 15 mm wide. These specimens were tested for their adhesive strength in the following manner:

Adhesive Strength Testing

Exfoliation strength was determined as a measure of adhesive strength by using an Instron type tensile tester at 23° C. and at a humidity of 65 percent, while setting the tension speed at 30 mm/min. and chuck spacing at 50 mm.

For the purpose of comparison, exfoliation strength of blended latex (i.e., comparative latex (I) from Example 1) of styrene-butadiene copolymer latex (41.9 part) and vinylidene chloride copolymer latex (58.1 part) was also measured in the same manner. The test results are presented in Table III.

TABLE III

| Copolymer Latex | Exfoliation Strength (kg/15 mm) | | |
|---|---|---|---|
| | Nylon/ Nylon | Polyester/ Polyester | Cotton Fabric/ Cotton Fabric |
| (B) | 2.5 | 1.8 | 6.3 |
| (D) | 2.7 | 1.1 | 5.8 |
| (F) | 3.5 | 0.9 | 5.0 |
| (I)* (Blended latex) | 1.2 | 0.2 | 1.3 |

*Not an example of the invention.

As will be readily understood from the results of the foregoing results of Examples No. 1 and No. 2, the copolymer latexes according to the present invention are useful as flame-retardant adhesives which have highly improved colloidal stability, heat and light resistance, and adhesive strength, and which provide excellent performance which is far from achievable with conventional copolymer latexes.

What is claimed is:

1. A copolymer latex which is obtained from emulsion copolymerization, in aqueous medium, of monomers consisting essentially of from about 5 to about 60 weight percent of an aliphatic conjugated diolefin, from about 5 to about 55 weight percent of a monoolefinic monomer selected from the group consisting of aromatic vinyl monomers, acrylate esters and methacrylate esters, from about 0.5 to about 10 weight percent of an ethylenically unsaturated carboxylic acid, and from about 25 to about 70 weight percent of vinylidene chloride, said copolymerization being arranged such that a first monomer mixture containing substantially all of the vinylidene chloride monomer and also containing acrylate or methacrylate ester monomer is first subjected to emulsion copolymerization and, then, a second monomer mixture containing substantially all of the aliphatic conjugated diolefin and substantially all of any aromatic vinyl monomer employed is subjected to emulsion copolymerization in the presence of the first copolymerization product.

2. The copolymer latex of claim 1 wherein the second monomer mixture contains ethylenically unsaturated carboxylic acid.

3. The copolymer latex of claim 2 wherein the second monomer mixture contains aromatic vinyl monomer.

4. The copolymer latex of claim 3 wherein the first monomer mixture contains ethylenically unsaturated carboxylic acid.

5. The copolymer latex of claim 4 wherein the first monomer mixture contains acrylate ester.

6. The copolymer latex of claim 5 wherein the second monomer mixture contains acrylate ester or methacrylate ester.

7. A flame-retardant or self-extinguishing adhesive composition comprising as a principal component thereof the copolymer latex of claim 1.

8. A fibrous article comprising copolymer solids of the copolymer latex of claim 1 as an adhesive binder therein or an adhesive coating thereon.

9. A laminated composite article comprising copolymer solids of the copolymer latex of claim 1 as an adhesive component thereof.

10. A paint composition comprising the copolymer latex of claim 1.

* * * * *